July 2, 1929.  P. C. MULLIGAN  1,719,191

REGULATING VALVE

Filed Aug. 4, 1928

INVENTOR
Paul C. Mulligan
BY
Frank Warren
ATTORNEY

Patented July 2, 1929.

1,719,191

UNITED STATES PATENT OFFICE.

PAUL C. MULLIGAN, OF SEATTLE, WASHINGTON, ASSIGNOR, BY MESNE ASSIGNMENTS, TO DUAL LUBRICATOR CO., OF SEATTLE, WASHINGTON.

REGULATING VALVE.

Application filed August 4, 1928. Serial No. 297,436.

My invention relates to improvements in regulating valves, and the object of my invention is to provide a regulating valve of simple and efficient construction which may be inserted in a liquid conduit line between the intake manifold of an internal combustion engine and a receptacle containing a supply of lubricant, whereby a desired quantity of the lubricant may be supplied or drawn by suction into the combustion chamber of the engine to lubricate the moving parts within and adjacent to said combustion chamber.

Another and more specific object of the invention is to provide a regulating valve for use in suction operated conduit lines which has a small air vent for admitting air from the atmosphere into the valve at or near the location of the valve seat to atomize the liquid which is passing through the valve and to keep the valve seat clean.

In providing lubricant for the overhead combustion chamber spaces of an internal combustion engine it is desirous to supply the correct amount of lubricant to properly lubricate all of the parts within and adjacent to the combustion chamber and I have found that in order to accomplish this result it is necessary to provide a valve of novel form to control the rate of flow of the lubricant from the source of supply receptacle to the combustion chamber so that a very small quantity of lubricant will flow constantly whenever the engine is running. The amount of lubricant which must pass is so small that it becomes difficult to obtain a valve that will constantly pass this small amount in a vacuum conduit system without becoming clogged and corroded by the lubricant. I find that by placing a small air vent in the valve casing at the proper location to admit air into the valve seat or into the conduit near the intake end of the valve seat I am enabled to regulate the supply of lubricant very accurately, to prevent the valve seat from becoming clogged or corroded, and to atomize the lubricant in a manner very desirable for lubrication purposes.

With the above and other objects in view, the invention consists in the novel construction, adaptation and combination of parts as will be more fully hereinafter described and claimed.

In the drawings Figure 1 is a somewhat diagrammatic illustration of an installation embodying my invention.

Figure 1:
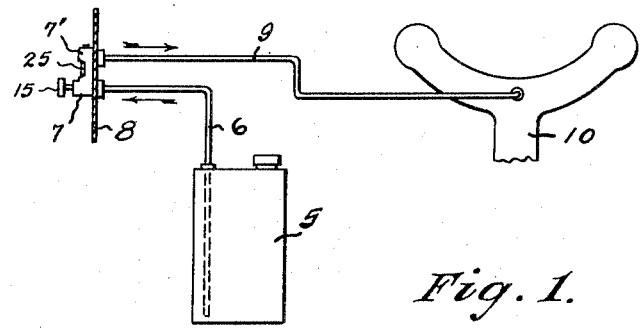
Figures 2, 3:
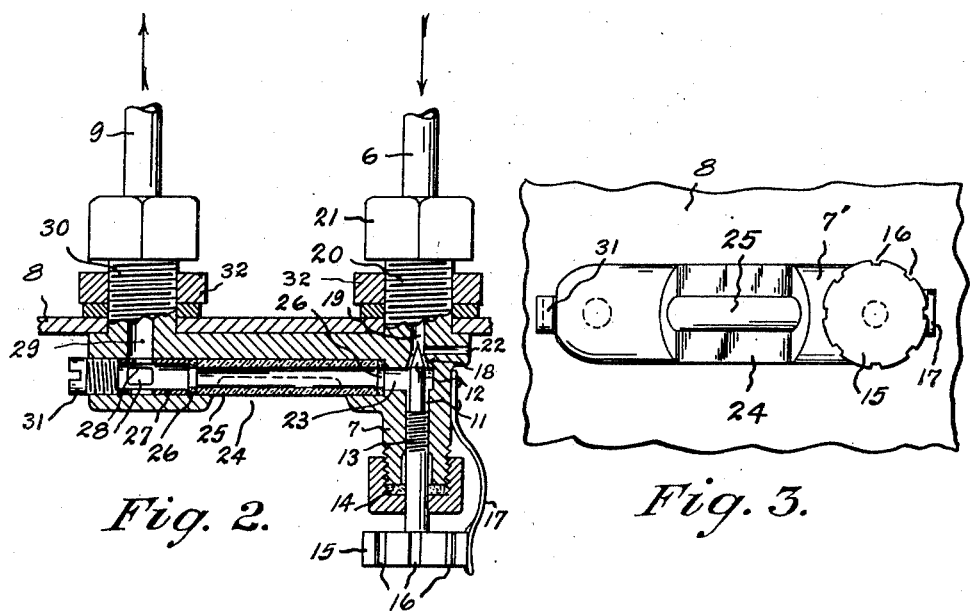
Fig. 2 is a cross sectional view of a valve embodied in my invention.
Fig. 3 is an elevation of said valve showing a fragment of an instrument board on which it may be mounted.

Referring to the drawings, throughout which like reference numerals designate like parts, I show apparatus for lubricating the combustion chamber of internal combustion engines, embodying a container 5 for lubricant, a conduit 6 extending from said container to a combined valve and sight tube housing 7—7' which may be secured to the instrument board 8 of a motor vehicle, and another conduit 9 extending from the valve and sight tube housing 7—7' to the inlet manifold 10 of an internal combustion engine. Said conduits and valve housing form a continuous passageway through which lubricant may be drawn by suction from the container 5 into the combustion chambers of an engine. The tube 6 preferably extends to a point near the bottom of the container 5 so that substantially all of the lubricant will be removed therefrom.

The valve housing 7 has a passageway 11 therein for the reception of a needle valve 12 which is screw threaded into said passageway as at 13. A gland 14 is provided around the stem of said valve and a finger disc 15 is provided on the end of the valve stem by which the stem may be turned to adjust the valve. A plurality of grooves 16 are provided in the periphery of the finger disc 15 for yieldingly receiving a detent spring 17.

The passageway 11 has a valve seat 18 formed therein through which it communicates with another passageway 19 in a shank 20 that extends through the instrument board 8 and is connected by a nut 21 with the conduit 6. A small hole 22 extends from the outside of the valve housing 7 inwardly and intersects the passageway 19 substantially at the entrance to the valve seat 18 so that air from the atmosphere may be drawn into the lubricant conduit at this point. This air thus admitted keeps the valve seat 18 absolutely clean and free from corrosion, breaks up the lubricant into a very fine spray thereby increasing its efficiency and makes it possible to regulate the necessarily small supply of oil more accurately than can be done without the admission of said air.

Extending at right angles to the valve housing 7 is an integral extension 7′ having a bore 23 which intersects the bore 11 just above the valve seat 18, one side of said extension being cut away as at 24 to afford a sight opening. A sight tube 25 preferably of glass, is disposed in the bore 23 with a packing washer 26 at each end. One packing washer rests against a shoulder in passageway 26 while the other packing washer is engaged by a metal tube having circumferential openings 28 which communicate with a passageway 29 in a boss 30. The tube 27 is held within the bore 23 by a screw 31, thus completing convenient assembly by which the sight tube 25 is mounted in an efficient and leak proof manner. The boss 30 is connected with the tube 9 which extends to the manifold 10. Nuts 32 secure the bosses 20 and 30 to the instrument board 8.

In the operation of this device the suction in the manifold 10 will cause oil to be drawn from the container 5 through the conduit 6, past the valve 12, through the sight tube 25, tube 27 passageway 29 and through the conduit 9 to the manifold 10. The air, entering through the perforation 22, keeps the valve seat clean, breaks up and atomizes the lubricant, and makes it possible to adjust the valve so as to draw a very small amount of lubricant without closing it so tightly that it will clog up.

The device is simple in construction efficient in operation, is ornamental on an instrument board or dash and is easy to instal on motor vehicles of the type now in common use.

Obviously changes in the precise construction of this apparatus may be made within the scope and spirit of the following claims.

What I claim is:

1. In a valve for use in a vacuum lubricating system, a housing having a passageway extending therethrough, and having a conical valve seat formed in said passageway and having a small air inlet opening terminating at the location of the smaller end of said conical valve seat, said housing having a suction passageway communicating with said first named passageway adjacent the larger end of said valve seat, and a conical valve operable in said first named passageway to close onto said valve seat.

2. In a vacuum operated lubricating system for the combustion chambers of internal combustion engines, a receptacle for lubricant, conduit means connecting said receptacle with the fuel inlet manifold of the engine and a regulating valve for lubricant interposed in said conduit said valve having a valve seat and having a small opening for admitting air at the location of said valve seat.

3. A vacuum system for supplying lubricant to the combustion chambers of an internal combustion engine, embodying conduit means, a valve housing, a sight tube housing connected with said valve housing, a sight tube in said sight tube housing, means for connecting said sight tube housing and said valve housing with said conduit means, said connecting means also serving to secure said valve housing and said sight tube housing to an instrument board and valve means in said valve housing.

4. An oil regulating valve embodying a valve housing having a passageway extending therethrough, a valve seat formed in said passageway, said housing having a small air inlet opening for admitting air at the location of said valve seat, a valve arranged to close on said seat, an integral sight tube housing extending at right angles from the valve housing and having, a passageway which intersects said first named passageway near the valve seat, said sight tube housing being cut away on one side to afford a sight opening, a sight tube in said sight tube housing, packing means for the ends of said sight tube, means for retaining the packing at one end of said sight tube said means having an opening therein, a screw holding said retaining means, a boss on said sight tube housing having a passageway that registers with the opening in said retaining means and a boss on said valve housing having a passageway in prolongation of said first named passageway.

In testimony whereof I affix my signature.

PAUL C. MULLIGAN.